United States Patent [19]

Murakami et al.

[11] 3,987,690
[45] Oct. 26, 1976

[54] POWER TRANSMISSION FOR MOTOR VEHICLES

[75] Inventors: Noboru Murakami, Nagoya; Koichiro Hirozawa, Kariya; Koichi Matsuo; Kazuo Obara, both of Toyota, all of Japan

[73] Assignee: Aisin Seiki Kabushiki Kaisha, Kariya, Japan

[22] Filed: Oct. 11, 1974

[21] Appl. No.: 514,268

[30] Foreign Application Priority Data
Oct. 12, 1973 Japan............................ 48-114983

[52] U.S. Cl. ................................................ 74/759
[51] Int. Cl.²........................................ F16H 57/10
[58] Field of Search ............ 74/759, 758, 753, 765, 74/764, 769, 768

[56] References Cited
UNITED STATES PATENTS

| | | |
|---|---|---|
| 3,482,469 | 12/1969 | Mori.................................... 74/759 X |
| 3,678,784 | 7/1972 | Lemieux................................ 74/759 |
| 3,736,815 | 6/1973 | Ito et al. ............................... 74/759 |
| 3,820,418 | 6/1974 | Ott........................................ 74/759 |

*Primary Examiner*—Samuel Scott
*Assistant Examiner*—Lance W. Chandler
*Attorney, Agent, or Firm*—Finnegan, Henderson, Farabow & Garrett

[57] ABSTRACT

Power transmission for motor vehicles including an input and an output shafts rotatable about a common axis, a planetary gear mechanism including interconnected three planetary gear sets, clutch means for selectively connecting elements of the gear mechanism with the input shaft, an element of the final stage gear set of the planetary gear mechanism being connected with the output shaft, brake means being provided for selectively constraining elements of the gear mechanism against rotation. A further set of planetary gear may be additionally combined with the planetary gear mechanism.

19 Claims, 10 Drawing Figures

POWER TRANSMISSION FOR MOTOR VEHICLES

The present invention relates to a transmission for a motor-driven vehicle such as an automobile. More particularly, the present invention relates to a power transmission suitable for use in combination with a fluid coupling.

It is preferred that power-transmission means for large motor vehicles such as trucks and buses have at least four stages of variable speed ratios. For providing such multiple-stage power transmissions, there has been proposed to use a gear mechanism including three or four combined sets of planetary gear means. The planetary gear means may be either or both of single pinion type or double pinion type. There are very many possibilities of combining such planetary gear means but, in any event, it is desirable that a transmission meets the following requirements:

i. In all of the stages, the output shaft should be connected with the same element in the gear mechanism;

ii. Each element in the gear mechanism should be operated with sufficiently low speed so that the speed at bearing portions can be reduced;

iii. From the viewpoint of durability of gear elements, the load on the gear teeth should be small;

iv. In each planetary gear means, the smallest gear should have a required number of teeth so that the necessary condition for gear meshing can be met;

v. Elements of the planetary gear means should be able to be connected together with minimum connecting length; and vi. Each speed changing should be performed through actuation of a single friction means so that minimum shock is produced during speed change.

Therefore, it is a primary object of the present invention to provide power transmission means for motor vehicles which meets the aforementioned requirements.

Another object of the present invention is to provide new speed-changing gear transmission means having at least four forward drive stages and at least one reverse drive stage.

According to the present invention, a power transmission for motor-driven vehicles includes a gear mechanism comprising a first planetary gear set having a first sun gear rotatably supported about a common axis, a first ring gear having internal teeth, and first planetary means including inner pinion means engaging said sun gear, outer pinion means engaging said inner pinion means and said first ring gear and a first planetary carrier supported for rotation about said common axis and rotatably supporting said inner and outer pinion means; a second planetary gear set having a second sun gear rotatably supported about said common axis, a second ring gear having internal teeth and connected with said first ring gear, second planetary pinion means engaging said second sun gear and the second ring gear, and a second planetary carrier connected with said first sun gear and rotatably supporting said second planetary pinion means; and a third planetary gear set having a third sun gear connected with said second sun gear, a third ring gear having internal teeth and connected with said second planetary carrier, third planetary pinion means engaging said third sun gear and said third ring gear, and a third planetary carrier rotatably supported about said common axis and rotatably supporting said third planetary pinion means. According to a further feature of the present invention, the third planetary carrier it connected with the output shaft of the transmission. The input shaft of the transmission may be selectively connected through suitable clutch means with the first planetary carrier, the first sun gear and the second and third sun gears. In a preferred mode of the present invention, the first pinion carrier, the first and second ring gears and the third ring gear are connected through respective releasable brake means with stationary part of the transmission, so that through selective actuation of the clutch means and the brake means a required number of speed changing stages can be obtained. The transmission can provide a satisfactory operation even when some of the clutch means and the brake means are omitted. It is of course possible to additionally combine one or more planetary gear sets to the above gear mechanism.

The above and other objects and features of the present invention will become apparent from the following descriptions of preferred embodiments thereof taking reference to the accompanying drawings, in which.

Figure 1:
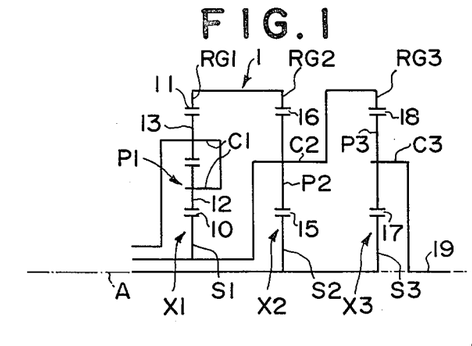
FIG. 1 is a schematic view showing the basic principle of the gear mechanism used in the present invention.

Referring to the drawings, particularly to FIG. 1, the gear mechanism 1 shown therein includes a first planetary gear set X1 which has a first sun gear S1 having external teeth 10 and supported for rotation about a common axis A, a ring gear RG1 having internal teeth 11, and first planetary pinion means P1 including inner planetary pinions 12 engaging the first sun gear S1 and outer planetary pinions 13 engaging the inner planetary pinions 12 and the first ring gear RG1. The inner and outer pinions 12 and 13 are rotatably supported by a planetary carrier C1 which is in turn supported for rotation about the common axis A.

The gear mechanism 1 also includes a second planetary gear set X2 which has a second sun gear S2 having external teeth 15 and supported for rotation about the common axis A, a second ring gear RG2 having internal teeth 16 and connected with the first ring gear RG1, and second planetary pinion means P2 engaging the teeth 15 and 16 of the second sun gear S2 and the ring gear RG2. The second planetary pinion gears P2 are rotatably supported by a second planetary carrier C2 which is connected with the first sun gear S1.

There is also provided a third planetary gear set X3 including a third sun gear S3 having external teeth 17 and connected with the second sun gear S2, a third ring gear RG3 having internal teeth 18 and connected with the second planetary carrier C2, and third planetary pinion gears P3 engaging the teeth 17 and 18 on the third sun gear S3 and the third ring gear RG3. The third planetary pinion gears P3 are rotatably supported by a third planetary carrier C3 which is integral or connected with an output shaft 19 of the transmission. The first sun gear S1, the first planetary carrier C1 or the second and third sun gears S2 and S3 may be connected with an input shaft of the transmission which is not shown in FIG. 1.

Figure 1A:
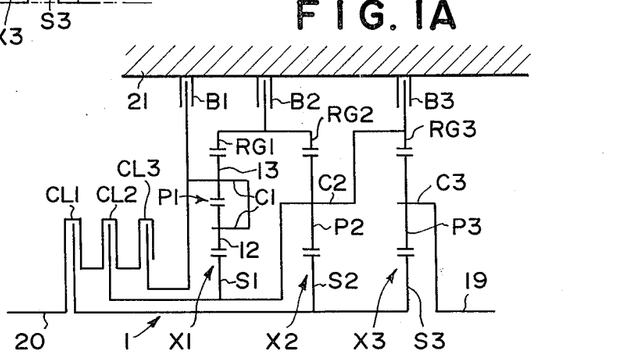
FIG. 1A is a schematic view showing an arrangement in accordance with one embodiment of the present invention.

Referring now to FIG. 1A which shows an embodiment of the present invention, the transmission includes the same gear mechanism 1 as shown in FIG. 1. Thus, corresponding parts in FIG. 1A are designated by the same reference characters as used in FIG. 1. According to this embodiment, the transmission includes an input shaft 19 which is connected through selectively engageable clutches CL1, CL2 and CL3 with the second and third sun gears S2 and S3, the first sun gear S1, and the first planetary carrier C1, respectively. Further, the first planetary carrier C1, the first and second ring gears RG1 and RG2, and the third ring gear RG3 are connected respectively through selectively releasable first, second and third brake means B1, B2 and B3 with a casing 21 of the transmission. The brake means B1, B2 and B3 serve, when actuated, respectively to restrain the associated first planetary carrier C1, the first and second ring gears RG1 and RG2 and the third ring gear RG3 against rotation. Similarly, the clutch means CL1, CL2 and CL3 serve, when actuated, respectively to connect the input shaft 20 with the second and third sun gears S2 and S3, the second planetary carrier C2 and the first planetary carrier C1.

In the gear mechanism 1 used in the transmission, it should be noted that the planetary gear sets X1, X2 and X3 have a relationship which can be represented by the following equations.

$$N_{RG1} - (1 - I_1) N_{C1} - I_1 N_{S1} = 0$$
$$N_{RG2} - (1 + I_2) N_{C2} + I_2 N_{S2} = 0$$
$$N_{RG2} - (1 + I_3) N_{C3} + I_3 N_{S3} = 0$$

where:
$N_{RG1}$, $N_{RG2}$ and $N_{RG3}$ respectively respresents the rotating speeds of the first, second and third ring gears;
$N_{C1}$, $N_{C2}$ and $N_{C3}$ the rotating speeds of the first, second and third planetary carriers;
$N_{S1}$, $N_{S2}$ and $N_{S3}$ the rotating speeds of the first, second and third sun gears; and,
$I_1$, $I_2$ and $I_3$ the diametrical ratios of the ring gears and the sun gears in the planetary gear sets X1, X2, and X3.

For the purpose of explanation, the value $I_1$ may be selected to 0.500, $I_2$ to 0.452 and $I_3$ to 0.355. Then, speed reduction ratios can be obtained in response to selective actuation of the clutch means CL1, CL2 and CL3 and the brake means B1, B2 and B3 as shown in Table 1. In Table 1, the character F shows that a forward drive can be obtained at the stage and R shows that a reverse drive can be obtained. It will be noted in Table 1 that the speed ratio of 1 : 1.00 can be obtained by engaging the clutch means CL1 and CL2 with the other clutch means CL3 and brake means B1, B2, and B3 disengaged.

TABLE 1

| | CL1 | CL2 | CL3 | B1 | B2 | B3 | SPEED RATIO |
|---|---|---|---|---|---|---|---|
| F1 | O | | | | | O | 1 : 3.82 |
| F2 | O | | | | O | | 1 : 2.03 |
| F3 | O | | | O | | | 1 : 1.63 |
| F4 | O | O | | | | | 1 : 1.00 |
| F5 | | O | | O | | | 1 : 0.78 |
| F6 | | O | | | | O | 1 : 0.63 |
| R1 | | | O | | | O | 1 : −3.45 |
| R2 | | | O | | O | | 1 : −0.63 |

Table 1A shows rotating speeds and tangential forces at each element of the gear mechanism in each stage of operation. In the table, the values of rotating speeds are shown in terms of ratios with respect to the values at the input shaft, and those of the tangential forces in terms of ratios with respect to the reaction forces at the ring gears. It should also be noted that the tangential forces at the planetary pinion gears are the same as those at the sun gears and/or ring gears. In Table 1A, the reference characters are the same as those used in FIG. 1A and Table 1 and the character A designates the speed changing stages and B the column for the elements in the gear mechanism. The rotating speed ratios are listed in the column designated by N and the tangential force in the column designated by W. The value O shows that the corresponding part is stationary or the tangential force does not exist. In the stage F4, the speed ratio is 1 : 1.00 so that all of the sun gears, the ring gears and the planetary carriers rotate at the same speed as the input shaft. The planetary pinions do not rotate at this stage. It should also be noted that in this stage two clutch means CL1 and CL2 are in engagement and the input torque from the input shaft is divided into two clutch means CL1 and CL2. Therefore, the tangential forces produced in this stage in the gear mechanism elements are apparently smaller than those produced in other stages of operation where only one of the clutch means is actuated. Thus, in Table 1A, the values corresponding to the stage F4 are omitted.

Figure 2:
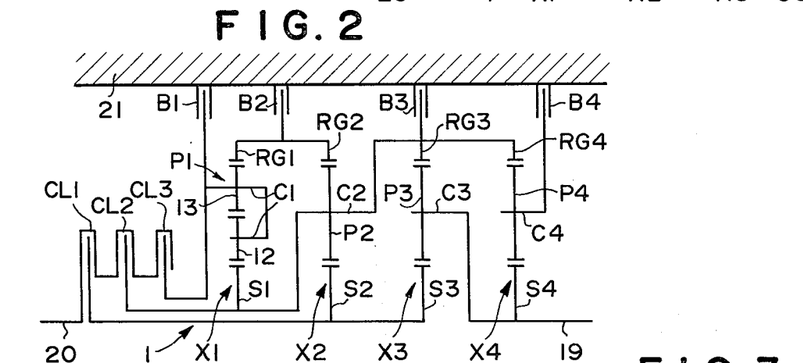
FIGS. 2 through 9 schematically show further embodiments of the present invention.

Referring to FIG. 2, there is shown another embodiment of the present invention in which the arrangements of the gear mechanism 1, the clutch means CL1, CL2 and CL3 and the brake means B1, B2 and B3 are the same as the arrangements in FIG. 1A. In the illustrated embodiment, a fourth planetary gear set X4 is additionally provided. The fourth planetary gear set X4 includes a fourth sun gear S4 which is integral or connected with the output shaft 19. The gear set X4 further includes a fourth ring gear RG4 connected with the third ring gear RG3, and fourth planetary pinion gears P4 engaging the fourth sun gear S4 and the fourth ring gear RG4. The planetary pinion gears P4 are rotatably supported by a fourth planetary carrier C4 which is connected through releasable brake means B4 with the casing 21 of the transmission. In the fourth planetary gear set X4, the following relationship is established.

$$N_{RG4} - (1 + I_4) N_{C4} + I_4 N_{S4} = 0$$

where:
$N_{RG4}$ designates the rotating speed of the fourth ring gear;
$N_{C4}$ the rotating speed of the fourth planetary carrier;
$N_{S4}$ the rotating speed of the fourth sun gear; and
$I_4$ the diametrical ratio between the fourth ring gear and the fourth sun gear.

TABLE 1A

| | B | X 1 | | | | X 2 | | | | X 3 | | | |
|---|---|---|---|---|---|---|---|---|---|---|---|---|---|
| A | | S1 | C1 | RG1 | P1 | P2 | S2 | C2 | RG2 | P3 | S3 | C3 | RG3 | P4 |
| | N | 0.0 | −0.90 | −0.45 | −1.93 | 1.93 | 1.00 | −0.00 | −0.45 | −1.65 | 1.00 | 0.26 | 0.00 | −0.81 |

TABLE 1A-continued

| A | B | X 1 | | | | X 2 | | | | X 3 | | | |
|---|---|---|---|---|---|---|---|---|---|---|---|---|---|
|   |   | S1 | C1 | RG1 | P1 | P2 | S2 | C2 | RG2 | P3 | S3 | C3 | RG3 | P4 |
| F1 | W | 0.00 | 0.0 | 0.00 | 0.00 | 0.00 | 0.0 | 0.00 | 0.00 | 0.00 | 2.82 | 5.63 | 2.82 | 2.82 |
|    | N | 0.31 | −0.31 | 0.0 | −1.33 | 1.33 | 1.00 | 0.31 | 0.0 | −1.14 | 1.00 | 0.49 | 0.31 | −0.56 |
| F2 | W | 0.0 | 0.0 | 0.0 | 0.0 | 0.0 | 1.03 | 2.07 | 1.03 | 1.03 | 1.50 | 3.00 | 1.50 | 1.50 |
|    | N | 0.47 | 0.0 | 0.24 | −1.01 | 1.01 | 1.00 | 0.47 | 0.24 | −0.87 | 1.00 | 0.61 | 0.47 | −0.43 |
| F3 | W | 1.27 | 2.53 | 1.27 | 1.27 | 1.27 | 1.27 | 2.53 | 1.27 | 1.27 | 1.21 | 2.41 | 1.21 | 1.21 |
|    | N | 1.00 | 0.0 | 0.50 | −2.13 | 2.13 | 2.11 | 1.00 | 0.50 | −1.82 | 2.11 | 1.29 | 1.00 | −0.90 |
| F5 | W | 0.45 | 0.90 | 0.45 | 0.45 | 0.45 | 0.45 | 0.90 | 0.45 | 0.45 | 0.57 | 1.14 | 0.57 | 0.57 |
|    | N | 1.00 | −1.00 | 0.0 | −4.26 | 4.26 | 3.21 | 1.00 | 0.0 | −3.65 | 3.21 | 1.58 | 1.00 | −1.80 |
| F6 | W | 0.0 | 0.0 | 0.0 | 0.0 | 0.0 | 0.37 | 0.73 | 0.37 | 0.37 | 0.47 | 0.93 | 0.47 | 0.47 |
|    | N | 0.0 | 1.00 | 0.50 | 2.13 | −2.13 | −1.11 | 0.00 | 0.50 | 1.82 | −1.11 | −0.29 | 0.00 | 0.90 |
| R1 | W | 2.00 | 4.00 | 2.00 | 2.00 | 2.00 | 2.00 | 4.00 | 2.00 | 2.00 | 2.55 | 5.09 | 2.55 | 2.55 |
|    | N | −1.00 | 1.00 | 0.0 | 4.26 | −4.26 | −3.21 | −1.00 | 0.0 | 3.65 | −3.21 | −1.58 | −1.00 | 1.80 |
| R2 | W | 2.00 | 4.00 | 2.00 | 2.00 | 2.00 | 0.37 | 0.73 | 0.37 | 0.37 | 0.47 | 0.93 | 0.47 | 0.47 |

For the purpose of explanation only, the value of $l_4$ may be selected to 0.562. Table 2 shows that speed reduction ratio obtained by the arrangement shown in FIG. 2 in response to selective actuation of the clutch means CL1, CL2 and CL3 and the brake means B1, B2, B3 and B4. Table 2A shows the speeds and tangential forces in the elements of the gear mechanism 1 used in the arrangement of FIG. 2.

TABLE 2

| | CL1 | CL2 | CL3 | B1 | B2 | B3 | B4 | SPEED RATIO |
|---|---|---|---|---|---|---|---|---|
| F1 | O | | | | | | O | 1 : 5.40 |
| F2 | O | | | | | O | | 1 : 3.82 |
| F3 | O | | | | O | | | 1 : 2.03 |
| F4 | O | | | O | | | | 1 : 1.63 |
| F5 | O | O | | | | | | 1 : 1.00 |
| F6 | | O | | O | | | | 1 : 0.78 |
| F7 | | O | | | | O | | 1 : 0.63 |
| R1 | | | O | | | | O | 1 : −5.95 |
| R2 | | | O | | | O | | 1 : −3.45 |

TABLE 2-continued

| | CL1 | CL2 | CL3 | B1 | B2 | B3 | B4 | SPEED RATIO |
|---|---|---|---|---|---|---|---|---|
| R3 | | | O | | O | | | 1 : −0.63 |

TABLE 2A

| A | B | X 1 | | | | | X 2 | | | |
|---|---|---|---|---|---|---|---|---|---|---|
|   |   | S1 | C1 | RG1 | P1 | P2 | S2 | C2 | RG2 | P3 |
| F1 | N | −0.10 | −1.10 | −0.60 | −2.13 | 2.13 | 1.00 | −0.10 | −0.60 | −1.82 |
|    | W | 0.00 | 0.0 | 0.00 | 0.00 | 0.00 | 0.00 | 0.00 | 0.00 | 0.00 |
| F2 | N | 0.0 | −0.90 | −0.45 | −1.93 | 1.93 | 1.00 | 0.00 | −0.45 | −1.65 |
|    | W | 0.00 | 0.0 | 0.00 | 0.00 | 0.00 | 0.0 | 0.00 | 0.00 | 0.00 |
| F3 | N | 0.31 | −0.31 | 0.0 | −1.33 | 1.33 | 1.00 | 0.31 | 0.0 | −1.14 |
|    | W | 0.0 | 0.0 | 0.0 | 0.0 | 0.0 | 1.03 | 2.07 | 1.03 | 1.03 |
| F4 | N | 0.47 | 0.0 | 0.24 | −1.01 | 1.01 | 1.00 | 0.47 | 0.24 | −0.87 |
|    | W | 1.27 | 2.53 | 1.27 | 1.27 | 1.27 | 1.27 | 2.53 | 1.27 | 1.27 |
| F6 | N | 1.00 | 0.0 | 0.50 | −2.13 | 2.13 | 2.11 | 1.00 | 0.50 | −1.82 |
|    | W | 0.45 | 0.90 | 0.45 | 0.45 | 0.45 | 0.45 | 0.90 | 0.45 | 0.45 |
| F7 | N | 1.00 | −1.00 | 0.0 | −4.26 | 4.26 | 3.21 | 1.00 | 0.0 | −3.65 |
|    | W | 0.0 | 0.0 | 0.0 | 0.0 | 0.0 | 0.37 | 0.73 | 0.37 | 0.37 |
| R1 | N | 0.09 | 1.00 | 0.55 | 1.93 | −1.93 | −0.91 | 0.09 | 0.55 | 1.65 |
|    | W | 2.00 | 4.00 | 2.00 | 2.00 | 2.00 | 2.00 | 4.00 | 2.00 | 2.00 |
| R2 | N | 0.0 | 1.00 | 0.50 | 2.13 | −2.13 | −1.11 | 0.00 | 0.50 | 1.82 |
|    | W | 2.00 | 4.00 | 2.00 | 2.00 | 2.00 | 2.00 | 4.00 | 2.00 | 2.00 |
| R3 | N | −1.00 | 1.00 | 0.0 | 4.26 | −4.26 | −3.21 | −1.00 | 0.0 | 3.65 |
|    | W | 2.00 | 4.00 | 2.00 | 2.00 | 2.00 | 0.37 | 0.73 | 0.37 | 0.37 |

| A | B | X 3 | | | | X 4 | | | |
|---|---|---|---|---|---|---|---|---|---|
|   |   | S3 | C3 | RG3 | P4 | S4 | C4 | RG4 | P5 |
| F1 | N | 1.00 | 0.19 | −0.10 | −0.90 | 0.19 | 0.00 | −0.10 | −0.48 |
|    | W | 2.82 | 5.63 | 2.82 | 2.82 | 2.82 | 5.63 | 2.82 | 2.82 |
| F2 | N | 1.00 | 0.26 | 0.00 | −0.81 | 0.26 | 0.09 | 0.00 | −0.43 |
|    | W | 2.82 | 5.63 | 2.82 | 2.82 | 0.0 | 0.0 | 0.0 | 0.0 |
| F3 | N | 1.00 | 0.49 | 0.31 | −0.56 | 0.49 | 0.38 | 0.31 | −0.30 |
|    | W | 1.50 | 3.00 | 1.50 | 1.50 | 0.0 | 0.0 | 0.0 | 0.0 |
| F4 | N | 1.00 | 0.61 | 0.47 | −0.43 | 0.61 | 0.52 | 0.47 | −0.23 |
|    | W | 1.21 | 2.41 | 1.21 | 1.21 | 0.0 | 0.0 | 0.0 | 0.0 |
| F6 | N | 2.11 | 1.29 | 1.00 | −0.90 | 1.29 | 1.10 | 1.00 | −0.48 |
|    | W | 0.57 | 1.14 | 0.57 | 0.57 | 0.0 | 0.0 | 0.0 | 0.0 |
| F7 | N | 3.21 | 1.58 | 1.00 | −1.80 | 1.58 | 1.21 | 1.00 | −0.95 |
|    | W | 0.47 | 0.93 | 0.47 | 0.47 | 0.0 | 0.0 | 0.0 | 0.0 |
| R1 | N | −0.91 | −0.17 | 0.09 | 0.81 | −0.17 | 0.00 | 0.09 | 0.43 |
|    | W | 2.55 | 5.09 | 2.55 | 2.55 | 4.45 | 8.90 | 4.45 | 4.45 |
| R2 | N | −1.11 | −0.29 | 0.00 | 0.90 | −0.29 | −0.10 | 0.00 | 0.48 |
|    | W | 2.55 | 5.09 | 2.55 | 2.55 | 0.0 | 0.0 | 0.0 | 0.0 |
| R3 | N | −3.21 | −1.58 | −1.00 | 1.80 | −1.58 | −1.21 | −1.00 | 0.95 |
|    | W | 0.47 | 0.93 | 0.47 | 0.47 | 0.0 | 0.0 | 0.0 | 0.0 |

Figure 3:
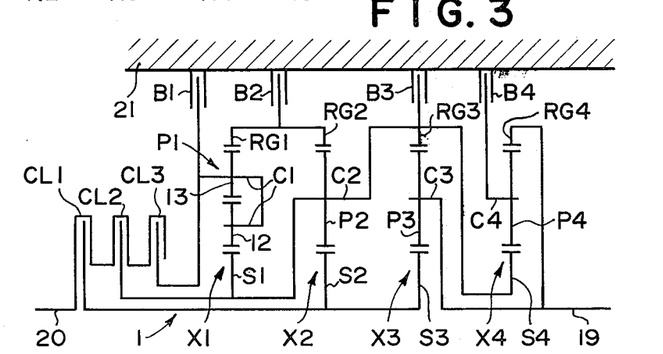

Referring to FIG. 3, there is shown a further embodiment of the present invention in which the arrangements of the gear mechanism 1, the clutch means CL1, CL2 and CL3 and the brake means B1, B2 and B3 are the same as that in the embodiments shown in FIGS. 1A and 2. As in the embodiment of FIG. 2, the illustrated embodiment also includes an additional or fourth planetary gear set X4 which comprises a fourth sun gear S4, fourth planetary pinion gears P4 engaging the fourth sun gear S4 and a fourth ring gear RG4 engaging the fourth pinion gears P4. The fourth sun gear S4 is connected with the third ring gear RG3 and the fourth ring gear RG4 is connected with the output shaft 19. The fourth planetary pinion gears P4 are rotatably supported with a fourth planetary carrier C4 which is connected through a releasable fourth brake means B4 with the casing 21. Thus, in this arrangement, when the brake means is actuated the sun gear S4 is constrained against rotation together with the third ring gear RG3, the second pinion carrier C2 and the first sun gear S1. When the fourth brake means B4 is actuated, the fourth planetary carrier C4 is clamped against rotation. As in the previous embodiments, speed reduction ratios obtained in various speed changing stages are shown in Table 3 and the rotating speed and the tangential forces at the elements in the gear mechanism are shown in Table 3A.

TABLE 3

| | CL1 | CL2 | CL3 | B1 | B2 | B3 | B4 | SPEED RATIO |
|---|---|---|---|---|---|---|---|---|
| F1 | O | | | | | | O | 1 : 8.83 |
| F2 | O | | | | | O | | 1 : 3.82 |
| F3 | O | | | | O | | | 1 : 2.03 |
| F4 | O | | O | | | | | 1 : 1.63 |
| F5 | O | O | | | | | | 1 : 1.00 |
| F6 | | O | | | | | O | 1 : 0.78 |
| F7 | | O | O | | | | | 1 : 0.63 |
| R1 | | | O | | | | O | 1 : -11.37 |
| R2 | | | O | | | O | | 1 : -3.45 |
| R3 | | | O | | O | | | 1 : -0.63 |

Figure 4:
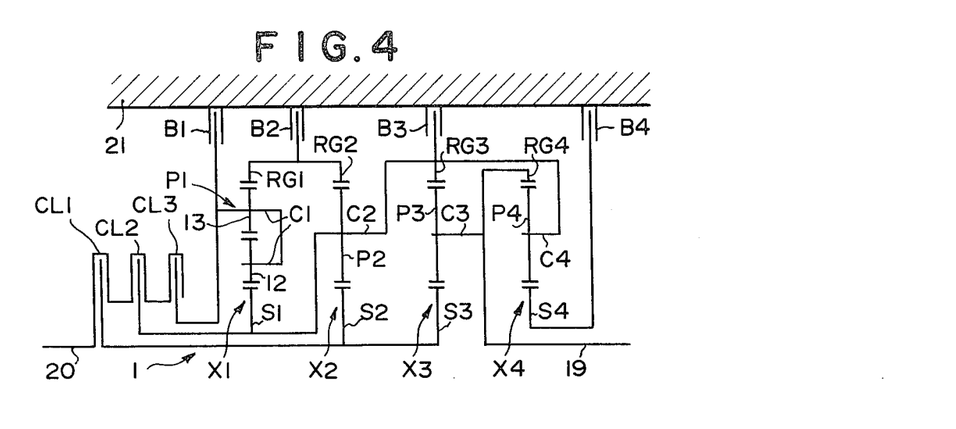

X4 comprising a fourth sun gear S4, fourth planetary pinion gears P4 carried by a fourth planetary carrier C4 and a fourth ring gear RG4. The fourth ring gear RG4 is connected with the third planetary carrier C3 of the gear mechanism 1 and the output shaft 19. The fourth planetary carrier C4 is connected with the third ring gear RG3 which is controlled by the third brake means B3. The fourth sun gear S4 is connected through fourth brake means B4 with the casing of the transmission, so that the fourth sun gear S4 is contrained against rotation when the fourth brake means B4 is actuated. For the purpose of explanation, the value $I_4$ in this arrangement may be selected to 0.562. Then, speed changing ratio in each speed changing stage can be obtained as shown in Table 4 in response to selective actuation of the clutch means CL1, CL2 and CL3 and the brake means B1, B2, B3 and B4. The rotating speeds and the tangential forces of the elements of the transmission in this instance are also shown in Table 4A.

TABLE 4

| | CL1 | CL2 | CL3 | B1 | B2 | B3 | B4 | SPEED RATIO |
|---|---|---|---|---|---|---|---|---|
| F1 | O | | | | | O | | 1 : 3.82 |
| F2 | O | | | | O | | | 1 : 2.03 |
| F3 | O | | | | | | O | 1 : 2.01 |
| F4 | O | | | | | O | | 1 : 1.63 |
| F5 | O | O | | | | | | 1 : 1.00 |
| F6 | | O | | | | O | | 1 : 0.78 |
| F7 | | O | | | | | O | 1 : 0.64 |
| F8 | | | O | | | | O | 1 : 0.63 |
| R1 | | | O | | | O | | 1 : 3.45 |
| R2 | | | O | | O | | | 1 : 0.62 |
| R3 | | | O | | | | O | 1 : 0.60 |

TABLE 3A

| A | B | S1 | C1 | X1 RG1 | P1 | P2 | S2 | C2 | X2 RG2 | P3 |
|---|---|---|---|---|---|---|---|---|---|---|
| F1 | N | -0.20 | -1.29 | -0.74 | -2.32 | 2.32 | 1.00 | -0.20 | -0.74 | -1.98 |
| | W | 0.00 | 0.0 | 0.00 | 0.00 | 0.00 | 0.00 | 0.00 | 0.00 | 0.00 |
| F2 | N | 0.0 | -0.90 | -0.45 | -1.93 | 1.93 | 1.00 | 0.00 | -0.45 | -1.65 |
| | W | 0.00 | 0.0 | 0.00 | 0.00 | 0.00 | 0.0 | 0.00 | 0.00 | 0.00 |
| F3 | N | 0.31 | -0.31 | 0.0 | -1.33 | 1.33 | 1.00 | 0.31 | 0.0 | -1.14 |
| | W | 0.0 | 0.0 | 0.0 | 0.0 | 0.0 | 1.03 | 2.07 | 1.03 | 1.03 |
| F4 | N | 0.47 | 0.0 | 0.24 | -1.01 | 1.01 | 1.00 | 0.47 | 0.24 | -0.87 |
| | W | 1.27 | 2.53 | 1.27 | 1.27 | 1.27 | 1.27 | 2.53 | 1.27 | 1.27 |
| F6 | N | 1.00 | 0.0 | 0.50 | -2.13 | 2.13 | 2.11 | 1.00 | 0.50 | -1.82 |
| | W | 0.45 | 0.90 | 0.45 | 0.45 | 0.45 | 0.45 | 0.90 | 0.45 | 0.45 |
| F7 | N | 1.00 | -1.00 | 0.0 | -4.26 | 4.26 | 3.21 | 1.00 | 0.0 | -3.65 |
| | W | 0.0 | 0.0 | 0.0 | 0.0 | 0.0 | 0.37 | 0.73 | 0.37 | 0.37 |
| R1 | N | 0.16 | 1.00 | 0.58 | 1.80 | -1.80 | -0.78 | 0.16 | 0.58 | 1.54 |
| | W | 2.00 | 4.00 | 2.00 | 2.00 | 2.00 | 2.00 | 4.00 | 2.00 | 2.00 |
| R2 | N | 0.0 | 1.00 | 0.50 | 2.13 | -2.13 | -1.11 | 0.00 | 0.50 | 1.82 |
| | W | 2.00 | 4.00 | 2.00 | 2.00 | 2.00 | 2.00 | 4.00 | 2.00 | 2.00 |
| R3 | N | -1.00 | 1.00 | 0.0 | 4.26 | -4.26 | -3.21 | -1.00 | 0.0 | 3.65 |
| | W | 2.00 | 4.00 | 2.00 | 2.00 | 2.00 | 0.37 | 0.73 | 0.37 | 0.37 |

| A | B | S3 | C3 | X3 RG3 | P4 | S4 | C4 | X4 RG4 | P5 |
|---|---|---|---|---|---|---|---|---|---|
| F1 | N | 1.00 | 0.11 | -0.20 | -0.98 | -0.20 | -0.00 | 0.11 | 0.52 |
| | W | 2.82 | 5.63 | 2.82 | 2.82 | 5.01 | 10.02 | 5.01 | 5.01 |
| F2 | N | 1.00 | 0.26 | 0.0 | -0.81 | 0.00 | 0.17 | 0.26 | 0.43 |
| | W | 2.82 | 5.63 | 2.82 | 2.82 | 0.0 | 0.0 | 0.0 | 0.0 |
| F3 | N | 1.00 | 0.49 | 0.31 | -0.56 | 0.31 | 0.43 | 0.49 | 0.30 |
| | W | 1.50 | 3.00 | 1.50 | 1.50 | 0.0 | 0.0 | 0.0 | 0.0 |
| F4 | N | 1.00 | 0.61 | 0.47 | -0.43 | 0.47 | 0.56 | 0.61 | 0.23 |
| | W | 1.21 | 2.41 | 1.21 | 1.21 | 0.0 | 0.0 | 0.0 | 0.0 |
| F6 | N | 2.11 | 1.29 | 1.00 | -0.90 | 1.00 | 1.19 | 1.29 | 0.48 |
| | W | 0.57 | 1.14 | 0.57 | 0.57 | 0.0 | 0.0 | 0.0 | 0.0 |
| F7 | N | 3.21 | 1.58 | 1.00 | -1.80 | 1.00 | 1.37 | 1.58 | 0.95 |
| | W | 0.47 | 0.93 | 0.47 | 0.47 | 0.0 | 0.0 | 0.0 | 0.0 |
| R1 | N | -0.78 | -0.09 | 0.16 | 0.76 | 0.16 | 0.00 | -0.09 | -0.40 |
| | W | 2.55 | 5.09 | 2.55 | 2.55 | 7.92 | 15.84 | 7.92 | 7.92 |
| R2 | N | -1.11 | -0.29 | 0.00 | 0.90 | 0.00 | -0.19 | -0.29 | -0.48 |
| | W | 2.55 | 5.09 | 2.55 | 2.55 | 0.0 | 0.0 | 0.0 | 0.0 |
| R3 | N | -3.21 | -1.58 | -1.00 | 1.80 | -1.00 | -1.37 | -1.58 | -0.95 |
| | W | 0.47 | 0.93 | 0.47 | 0.47 | 0.0 | 0.0 | 0.0 | 0.0 |

Referring further to FIG. 4, there is shown another embodiment which has the basic arrangements of the gear mechanism 1, the clutch means CL1, CL2 and CL3 and the brake means B1, B2 and B3 as shown in FIG. 1A, and an additional or fourth planetary gear set

TABLE 4A

| A | B | X 1 | | | | | X 2 | | | |
|---|---|---|---|---|---|---|---|---|---|---|
|   |   | S 1 | C 1 | RG 1 | P 1 | P 2 | S 2 | C 2 | RG 2 | P 3 |
| F1 | N | 0.0 | −0.90 | −0.45 | −1.93 | 1.93 | 1.00 | 0.00 | −0.45 | −1.65 |
|    | W | 0.00 | 0.0 | 0.00 | 0.00 | 0.00 | 0.0 | 0.00 | 0.00 | 0.00 |
| F2 | N | 0.31 | −0.31 | 0.0 | −1.33 | 1.33 | 1.00 | 0.31 | 0.0 | −1.14 |
|    | W | 0.0 | 0.0 | 0.0 | 0.0 | 0.0 | 1.03 | 2.07 | 1.03 | 1.03 |
| F3 | N | 0.32 | −0.30 | 0.01 | −1.31 | 1.31 | 1.00 | 0.32 | 0.01 | −1.13 |
|    | W | 0.00 | 0.0 | 0.00 | 0.00 | 0.00 | 0.0 | 0.00 | 0.00 | 0.00 |
| F4 | N | 0.47 | 0.0 | 0.24 | −1.01 | 1.01 | 1.00 | 0.47 | 0.24 | −0.87 |
|    | W | 1.27 | 2.53 | 1.27 | 1.27 | 1.27 | 1.27 | 2.53 | 1.27 | 1.27 |
| F6 | N | 1.00 | 0.0 | 0.50 | −2.13 | 2.13 | 2.11 | 1.00 | 0.50 | −1.82 |
|    | W | 0.45 | 0.90 | 0.45 | 0.45 | 0.45 | 0.45 | 0.90 | 0.45 | 0.45 |
| F7 | N | 1.00 | −0.94 | 0.03 | −4.13 | 4.13 | 3.15 | 1.00 | 0.03 | −3.54 |
|    | W | 0.00 | 0.0 | 0.00 | 0.00 | 0.00 | 0.00 | 0.00 | 0.00 | 0.00 |
| F8 | N | 1.00 | −1.00 | 0.0 | −4.26 | 4.26 | 3.21 | 1.00 | 0.0 | −3.65 |
|    | W | 0.0 | 0.0 | 0.0 | 0.0 | 0.0 | 0.37 | 0.73 | 0.37 | 0.37 |
| R1 | N | 0.0 | 1.00 | 0.50 | 2.13 | −2.13 | −1.11 | 0.00 | 0.50 | 1.82 |
|    | W | 2.00 | 4.00 | 2.00 | 2.00 | 2.00 | 2.00 | 4.00 | 2.00 | 2.00 |
| R2 | N | −1.00 | 1.00 | 0.0 | 4.26 | −4.26 | −3.21 | −1.00 | 0.0 | 3.65 |
|    | W | 2.00 | 4.00 | 2.00 | 2.00 | 2.00 | 0.37 | 0.73 | 0.37 | 0.37 |
| R3 | N | −1.06 | 1.00 | −0.03 | 4.40 | −4.40 | −3.35 | −1.06 | −0.03 | 3.77 |
|    | W | 2.00 | 4.00 | 2.00 | 2.00 | 2.00 | 2.00 | 4.00 | 2.00 | 2.00 |

| A | B | x 3 | | | | X 4 | | | |
|---|---|---|---|---|---|---|---|---|---|
|   |   | S 3 | C 3 | RG 3 | P 4 | S 4 | C 4 | RG 4 | P 5 |
| F1 | N | 1.00 | 0.26 | 0.00 | −0.81 | −0.47 | 0.00 | 0.26 | 1.20 |
|    | W | 2.82 | 5.63 | 2.82 | 2.82 | 0.0 | 0.0 | 0.0 | 0.0 |
| F2 | N | 1.00 | 0.49 | 0.31 | −0.56 | −0.01 | 0.31 | 0.49 | 0.82 |
|    | W | 1.50 | 3.00 | 1.50 | 1.50 | 0.0 | 0.0 | 0.0 | 0.0 |
| F3 | N | 1.00 | 0.50 | 0.32 | −0.55 | 0.0 | 0.32 | 0.50 | 0.82 |
|    | W | 2.82 | 5.63 | 2.82 | 2.82 | 1.80 | 3.61 | 1.80 | 1.80 |
| F4 | N | 1.00 | 0.61 | 0.47 | −0.43 | 0.23 | 0.47 | 0.61 | 0.63 |
|    | W | 1.21 | 2.41 | 1.21 | 1.21 | 0.0 | 0.0 | 0.0 | 0.0 |
| F6 | N | 2.11 | 1.29 | 1.00 | −0.90 | 0.48 | 1.00 | −1.29 | 1.32 |
|    | W | 0.57 | 1.14 | 0.57 | 0.57 | 0.0 | 0.0 | 0.0 | 0.0 |
| F7 | N | 3.15 | 1.56 | 1.00 | −1.74 | 0.0 | 1.00 | 1.56 | 2.57 |
|    | W | 0.00 | 0.00 | 0.00 | 0.00 | 0.64 | 1.28 | 0.64 | 0.64 |
| F8 | N | 3.21 | 1.58 | 1.00 | −1.80 | −0.03 | 1.00 | 1.58 | 2.65 |
|    | W | 0.47 | 0.93 | 0.47 | 0.47 | 0.0 | 0.0 | 0.0 | 0.0 |
| R1 | N | −1.11 | −0.29 | 0.00 | 0.90 | 0.52 | 0.00 | −0.29 | −1.32 |
|    | W | 2.55 | 5.09 | 2.55 | 2.55 | 0.0 | 0.0 | 0.0 | 0.0 |
| R2 | N | −3.21 | −1.58 | −1.00 | 1.80 | 0.03 | −1.00 | −1.58 | −2.65 |
|    | W | 0.47 | 0.93 | 0.47 | 0.47 | 0.0 | 0.0 | 0.0 | 0.0 |
| R3 | N | −3.35 | −1.66 | −1.06 | 1.86 | 0.0 | −1.06 | −1.66 | −2.73 |
|    | W | 2.55 | 5.09 | 2.55 | 2.55 | 2.85 | 5.70 | 2.85 | 2.85 |

Figure 5:
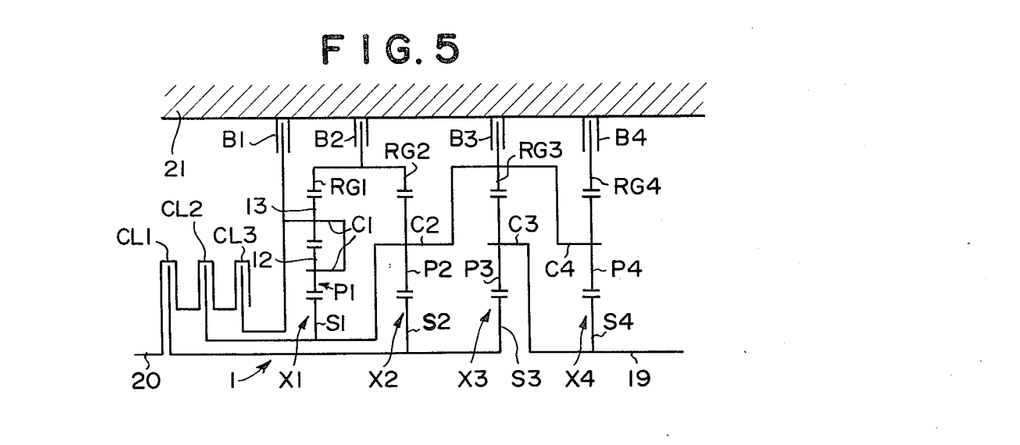

Referring further to FIG. 5, there is shown a further embodiment of the present invention in which the arrangements of the gear mechanism 1 comprising the planetary gear sets X1, X2 and X3, the clutch means CL1, CL2 and CL3 and the brake means B1, B2 and B3 are the same as in the previous embodiments. The embodiment shown in FIG. 5 also includes a fourth planetary gear set X4 which comprises a fourth sun gear S4, fourth planetary pinion gears P4 meshing with the sun gear S4 and a fourth ring gear RG4. The fourth planetary pinion gears P4 are rotatably supported by a fourth planetary carrier C4 which is connected with the third ring gear RG3. Since the third ring gear RG3 is combined with the third brake means B3, the fourth planetary carrier C4 is contrained against rotation when the third brake means B3 is actuated. The fourth sun gear S4 is connected with the output shaft 19 and the third planetary carrier C3, and the fourth ring gear RG4 is connected through fourth brake means B4 with the casing 21 of the transmission so that the fourth ring gear RG4 is constrained against rotation when the fourth brake means B4 is actuated. As in the previous embodiment, it is assumed for the purpose of description that the value $I_4$ is selected to 0.562 and the speed ratios in a every speed changing stages in this instance are shown in Table 4. Also, the rotating speeds and the tangential forces in the elements of the planetary gear sets are shown in Table 5A.

TABLE 5

| | CL1 | CL2 | CL3 | B1 | B2 | B3 | B4 | SPEED RATIO |
|---|---|---|---|---|---|---|---|---|
| F1 | O | | | | | O | | 1 : 3.82 |
| F2 | O | | | | | | O | 1 : 2.80 |
| F3 | O | | | | | O | | 1 : 2.03 |
| F4 | O | | | | O | | | 1 : 1.63 |
| F5 | O | O | | | | | | 1 : 1.00 |
| F6 | | O | | | O | | | 1 : 0.78 |
| F7 | | O | | | | O | | 1 : 0.63 |
| R1 | | | O | | | O | | 1 : −3.45 |
| R2 | | | O | | | | O | 1 : −1.85 |
| R3 | | | O | | O | | | 1 : −0.63 |

TABLE 5A

| A | B | X 1 | | | | | X 2 | | | |
|---|---|---|---|---|---|---|---|---|---|---|
|   |   | S 1 | C 1 | RG 1 | P 1 | P 2 | S 2 | C 2 | RG 2 | P 3 |
| F1 | N | 0.0 | −0.90 | −0.45 | −1.93 | 1.93 | 1.00 | 0.00 | −0.45 | −1.65 |
|    | W | 0.00 | 0.0 | 0.00 | 0.00 | 0.00 | 0.0 | 0.00 | 0.00 | 0.00 |
| F2 | N | 0.13 | −0.66 | −0.27 | −1.68 | 1.68 | 1.00 | 0.13 | −0.27 | −1.44 |
|    | W | 0.0 | 0.0 | 0.0 | 0.0 | 0.0 | 0.0 | 0.0 | 0.0 | 0.0 |
| F3 | N | 0.31 | −0.31 | 0.0 | −1.33 | 1.33 | 1.00 | 0.31 | 0.0 | −1.14 |
|    | W | 0.0 | 0.0 | 0.0 | 0.0 | 0.0 | 1.03 | 2.07 | 1.03 | 1.03 |
| F4 | N | 0.47 | 0.0 | 0.24 | −1.01 | 1.01 | 1.00 | 0.47 | 0.24 | −0.87 |
|    | W | 1.27 | 2.53 | 1.27 | 1.27 | 1.27 | 1.27 | 2.53 | 1.27 | 1.27 |

TABLE 5A-continued

| A | B | X 3 | | | | X 4 | | | |
|---|---|---|---|---|---|---|---|---|---|
| | | S 3 | C 3 | RG 3 | P 4 | S 4 | C 4 | RG 4 | P 5 |
| F6 | N | 1.00 | 0.0 | 0.50 | −2.13 | 2.13 | 2.11 | 1.00 | 0.50 | −1.82 |
| | W | 0.45 | 0.90 | 0.45 | 0.45 | 0.45 | 0.45 | 0.90 | 0.45 | 0.45 |
| F7 | N | 1.00 | −1.00 | 0.0 | −4.26 | 4.26 | 3.21 | 1.00 | 0.0 | −3.65 |
| | W | 0.0 | 0.0 | 0.0 | 0.0 | 0.0 | 0.37 | 0.73 | 0.37 | 0.37 |
| R1 | N | 0.0 | 1.00 | 0.50 | 2.13 | −2.13 | −1.11 | 0.00 | 0.50 | 1.82 |
| | W | 2.00 | 4.00 | 2.00 | 2.00 | 2.00 | 2.00 | 4.00 | 2.00 | 2.00 |
| R2 | N | −0.19 | 1.00 | 0.40 | 2.55 | −2.55 | −1.52 | −0.19 | 0.40 | 2.18 |
| | W | 2.00 | 4.00 | 2.00 | 2.00 | 2.00 | 2.00 | 4.00 | 2.00 | 2.00 |
| R3 | N | −1.00 | 1.00 | 0.0 | 4.26 | −4.26 | −3.21 | −1.00 | 0.0 | 3.65 |
| | W | 2.00 | 4.00 | 2.00 | 2.00 | | 0.37 | 0.73 | 0.37 | 0.37 |

| A | B | X 3 | | | | X 4 | | | |
|---|---|---|---|---|---|---|---|---|---|
| | | S 3 | C 3 | RG 3 | P 4 | S 4 | C 4 | RG 4 | P 5 |
| F1 | N | 1.00 | 0.26 | 0.00 | −0.81 | 0.26 | 0.00 | −0.15 | −0.67 |
| | W | 2.82 | 5.63 | 2.82 | 2.82 | 0.0 | 0.0 | 0.0 | 0.0 |
| F2 | N | 1.00 | 0.36 | 0.13 | −0.71 | 0.36 | 0.13 | 0.0 | −0.59 |
| | W | 2.82 | 5.63 | 2.82 | 2.82 | 1.80 | 3.61 | 1.80 | 1.80 |
| F3 | N | 1.00 | 0.49 | 0.31 | −0.56 | 0.49 | 0.31 | 0.21 | −0.46 |
| | W | 1.50 | 3.00 | 1.50 | 1.50 | 0.0 | 0.0 | 0.0 | 0.0 |
| F4 | N | 1.00 | 0.61 | 0.47 | −0.43 | 0.61 | 0.47 | 0.40 | −0.35 |
| | W | 1.21 | 2.41 | 1.21 | 1.21 | 0.0 | 0.0 | 0.0 | 0.0 |
| F6 | N | 2.11 | 1.29 | 1.00 | −0.90 | 1.29 | 1.00 | 0.84 | −0.74 |
| | W | 0.57 | 1.14 | 0.57 | 0.57 | 0.0 | 0.0 | 0.0 | 0.0 |
| F7 | N | 3.21 | 1.58 | 1.00 | −1.80 | 1.58 | 1.00 | 0.67 | −1.49 |
| | W | 0.47 | 0.93 | 0.47 | 0.47 | 0.0 | 0.0 | 0.0 | 0.0 |
| R1 | N | −1.11 | −0.29 | 0.00 | 0.90 | −0.29 | 0.00 | 0.16 | 0.74 |
| | W | 2.55 | 5.09 | 2.55 | 2.55 | 0.0 | 0.0 | 0.0 | 0.0 |
| R2 | N | −1.52 | −0.54 | −0.19 | 1.07 | −0.54 | −0.19 | 0.0 | 0.89 |
| | W | 2.55 | 5.09 | 2.55 | 2.55 | 2.85 | 5.70 | 2.85 | 2.85 |
| R3 | N | −3.21 | −1.58 | −1.00 | 1.80 | −1.58 | −1.00 | −0.67 | 1.49 |
| | W | 0.47 | 0.93 | 0.47 | 0.47 | 0.0 | 0.0 | 0.0 | 0.0 |

Figure 6:
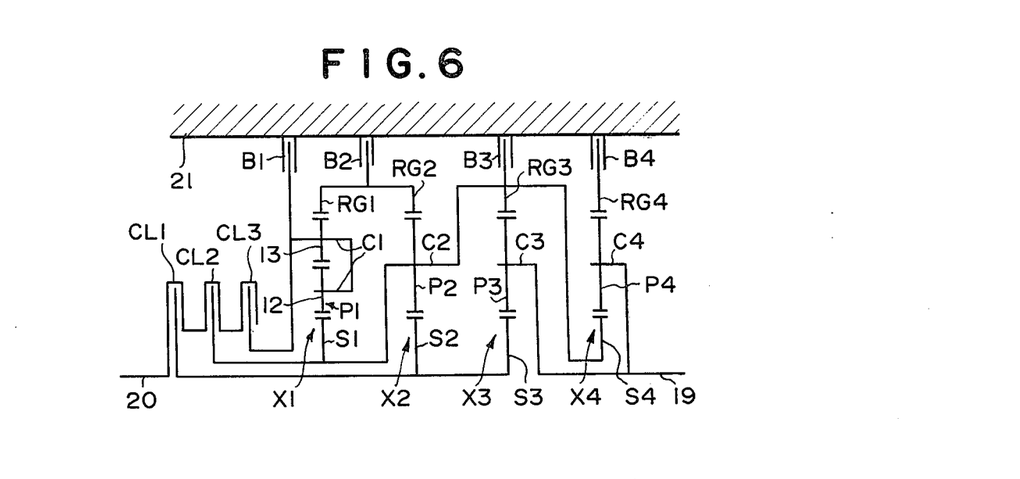

Referring next to FIG. 6, the embodiment shown therein is different from the previous embodiment in that the fourth sun gear S4 of the fourth planetary gear set X4 is connected with the third ring gear RG3, the fourth planetary carrier C4 with the output shaft 19, and the fourth ring gear RG4 through fourth brake means B4 with the casing 21. Thus, in this embodiment, the fourth sun gear S4 is constrained against rotation when the fourth brake means B4 is actuated, and the fourth ring gear RG4 is constrained from rotation when the fourth brake means B4 is actuated. The speed ratios in respective speed changing stages obtained under the value of $I_4$ of 0.437 are shown in Table 6. The rotating speeds and the tangential forces in the elements of the planetary gear sets are shown in Table 6A.

TABLE 6

| | CL1 | CL2 | CL3 | B1 | B2 | B3 | B4 | SPEED RATIO |
|---|---|---|---|---|---|---|---|---|
| F1 | | | O | | | | O | 1 : 11.18 |
| F2 | O | | | | | O | | 1 : 3.82 |
| F3 | | O | | | | | O | 1 : 3.29 |
| F4 | O | | | | | O | | 1 : 2.03 |
| F5 | O | | | | O | | | 1 : 1.63 |
| F6 | O | O | | | | | | 1 : 1.00 |
| F7 | | O | | O | | | | 1 : 0.78 |
| F8 | | O | | | | O | | 1 : 0.63 |
| R1 | O | | | | | | O | 1 : −5.45 |
| R2 | | | | | | O | | 1 : −3.45 |
| R3 | | | | | O | | | 1 : −0.63 |

TABLE 6A

| A | B | X 1 | | | | | X 2 | | | |
|---|---|---|---|---|---|---|---|---|---|---|
| | | S 1 | C 1 | RG 1 | P 1 | P 2 | S 2 | C 2 | RG 2 | P 3 |
| F1 | N | 0.29 | 1.00 | 0.65 | 1.51 | −1.51 | −0.49 | 0.29 | 0.65 | 1.29 |
| | W | 2.00 | 4.00 | 2.00 | 2.00 | 2.00 | 2.00 | 4.00 | 2.00 | 2.00 |
| F2 | N | 0.0 | −0.90 | −0.45 | −1.93 | 1.93 | 1.00 | 0.00 | −0.45 | −1.65 |
| | W | 0.00 | 0.0 | 0.00 | 0.00 | 0.00 | 0.0 | 0.00 | 0.00 | 0.00 |
| F3 | N | 1.00 | 3.40 | 2.20 | 5.12 | −5.12 | −1.66 | 1.00 | 2.20 | 4.38 |
| | W | 0.00 | 0.0 | 0.00 | 0.00 | 0.00 | 0.00 | 0.00 | 0.00 | 0.00 |
| F4 | N | 0.31 | −0.31 | 0.0 | −1.33 | 1.33 | 1.00 | 0.31 | 0.0 | −1.14 |
| | W | 0.0 | 0.0 | 0.0 | 0.0 | 0.0 | 1.03 | 2.07 | 1.03 | 1.03 |
| F5 | N | 0.47 | 0.0 | 0.24 | −1.01 | 1.01 | 1.00 | 0.47 | 0.24 | −0.87 |
| | W | 1.27 | 2.53 | 1.27 | 1.27 | 1.27 | 1.27 | 2.53 | 1.27 | 1.27 |
| F7 | N | 1.00 | 0.0 | 0.50 | −2.13 | 2.13 | 2.11 | 1.00 | 0.50 | −1.82 |
| | W | 0.45 | 0.90 | 0.45 | 0.45 | 0.45 | 0.45 | 0.90 | 0.45 | 0.45 |
| F8 | N | 1.00 | −1.00 | 0.0 | −4.26 | 4.26 | 3.21 | 1.00 | 0.0 | −3.65 |
| | W | 0.0 | 0.0 | 0.0 | 0.0 | 0.0 | 0.37 | 0.73 | 0.37 | 0.37 |
| R1 | N | −0.60 | −2.05 | −1.33 | −3.09 | 3.09 | 1.00 | −0.60 | −1.33 | −2.65 |
| | W | 0.00 | 0.0 | 0.00 | 0.00 | 0.00 | 0.0 | 0.00 | 0.00 | 0.00 |
| R2 | N | 0.0 | 1.00 | 0.50 | 2.13 | −2.13 | −1.11 | 0.00 | 0.50 | 1.82 |
| | W | 2.00 | 4.00 | 2.00 | 2.00 | 2.00 | 2.00 | 4.00 | 2.00 | 2.00 |
| R3 | N | −1.00 | 1.00 | 0.0 | 4.26 | −4.26 | −3.21 | −1.00 | 0.0 | 3.65 |
| | W | 2.00 | 4.00 | 2.00 | 2.00 | 2.00 | 0.37 | 0.73 | 0.37 | 0.37 |

| A | B | X 3 | | | | X 4 | | | |
|---|---|---|---|---|---|---|---|---|---|
| | | S 3 | C 3 | RG 3 | P 4 | S 4 | C 4 | RG 4 | P 5 |
| F1 | N | −0.49 | 0.09 | 0.29 | 0.63 | 0.29 | 0.09 | 0.0 | −0.32 |
| | W | 2.55 | 5.09 | 2.55 | 2.55 | 10.18 | 20.37 | 10.18 | 10.18 |
| F2 | N | 1.00 | 0.26 | 0.00 | −0.81 | 0.00 | 0.26 | 0.38 | 0.41 |
| | W | 2.82 | 5.63 | 2.82 | 2.82 | 0.0 | 0.0 | 0.0 | 0.0 |
| | N | −1.66 | 0.30 | 1.00 | 2.16 | 1.00 | 0.30 | 0.0 | −1.08 |

TABLE 6A-continued

| | | | | | | | | | |
|---|---|---|---|---|---|---|---|---|---|
| F3 | W | 0.00 | 0.00 | 0.00 | 0.00 | 2.29 | 4.58 | 2.29 | 2.29 |
| | N | 1.00 | 0.49 | 0.31 | −0.56 | 0.31 | 0.49 | 0.57 | 0.28 |
| F4 | W | 1.50 | 3.00 | 1.50 | 1.50 | 0.0 | 0.0 | 0.0 | 0.0 |
| | N | 1.00 | 0.61 | 0.47 | −0.43 | 0.47 | 0.61 | 0.67 | 0.21 |
| F5 | W | 1.21 | 2.41 | 1.21 | 1.21 | 0.0 | 0.0 | 0.0 | 0.0 |
| | N | 2.11 | 1.29 | 1.00 | −0.90 | 1.00 | 1.29 | 1.42 | 0.45 |
| F7 | W | 0.57 | 1.14 | 0.57 | 0.57 | 0.0 | 0.0 | 0.0 | 0.0 |
| | N | 3.21 | 1.58 | 1.00 | −1.80 | 1.00 | 1.58 | 1.83 | 0.90 |
| F8 | W | 0.47 | 0.93 | 0.47 | 0.47 | 0.0 | 0.0 | 0.0 | 0.0 |
| | N | 1.00 | −0.18 | −0.60 | −1.30 | −0.60 | −0.18 | 0.0 | 0.65 |
| R1 | W | 2.82 | 5.63 | 2.82 | 2.82 | 6.45 | 12.89 | 6.45 | 6.45 |
| | N | −1.11 | −0.29 | 0.00 | 0.90 | 0.00 | −0.29 | −0.42 | −0.45 |
| R2 | W | 2.55 | 5.09 | 2.55 | 2.55 | 0.0 | 0.0 | 0.0 | 0.0 |
| | N | −3.21 | −1.58 | −1.00 | 1.80 | −1.00 | −1.58 | −1.83 | −0.90 |
| R3 | W | 0.47 | 0.93 | 0.47 | 0.47 | 0.0 | 0.0 | 0.0 | 0.0 |

Figure 7:
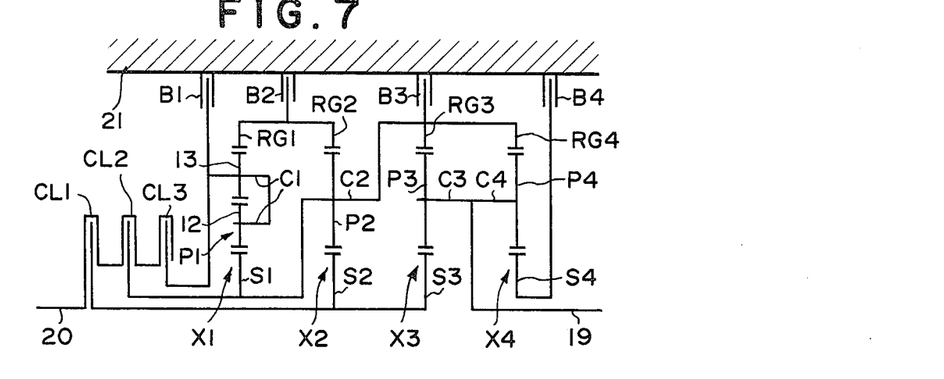

FIG. 7 shows still further embodiment of the present invention which is different from the previous embodiment only in that the fourth brake means B4 is interposed between the fourth sun gear S4 and the casing 21 while the fouth planetary carrier C4 is connected with the output shaft 19 and the fourth ring gear RG4 is connected with the third ring gear RG3. The speed ratios in respective speed changing stages obtained under the value of $I_4$ of 0.562 in response to selective actuation of the clutch means CL1, CL2 and CL3 and the break means B1, B2 and B3 are shown in Table 7. The rotating speeds and the tangential forces in the respective elements of the planetary gear sets are also shown in Table 7A.

TABLE 7

| | CL1 | CL2 | CL3 | B1 | B2 | B3 | B4 | SPEED RATIO |
|---|---|---|---|---|---|---|---|---|
| F1 | O | | | | | | O | 1 : 3.82 |
| F2 | | O | | | | | O | 1 : 3.50 |
| F3 | O | | | | O | | | 1 : 2.08 |
| F4 | O | | | | | O | | 1 : 1.63 |
| F5 | | O | | | | | O | 1 : 1.56 |
| F6 | O | O | | | | | | 1 : 1.00 |
| F7 | | O | | | O | | | 1 : 0.78 |
| F8 | | O | | | | O | | 1 : 0.63 |
| R1 | | | O | | | O | | 1 : −3.45 |
| R2 | | | O | | O | | | 1 : −0.63 |

TABLE 7A

| A | G | X1 | | | | | X2 | | | |
|---|---|---|---|---|---|---|---|---|---|---|
| | | S1 | C1 | RG1 | P1 | P2 | S2 | C2 | RG2 | P3 |
| F1 | N | 0.0 | −0.90 | −0.45 | −1.93 | 1.93 | 1.00 | 0.00 | −0.45 | −1.65 |
| | W | 0.00 | 0.0 | 0.00 | 0.00 | 0.00 | 0.0 | 0.00 | 0.00 | 0.00 |
| F2 | N | 0.45 | 1.00 | 0.72 | 1.18 | −1.18 | −0.17 | 0.45 | 0.72 | 1.01 |
| | W | 2.00 | 4.00 | 2.00 | 2.00 | 2.00 | 2.00 | 4.00 | 2.00 | 2.00 |
| F3 | N | 0.31 | −0.31 | 0.0 | −1.33 | 1.33 | 1.00 | 0.31 | 0.0 | −1.14 |
| | W | 0.0 | 0.0 | 0.0 | 0.0 | 0.0 | 1.03 | 2.07 | 1.03 | 1.03 |
| F4 | N | 0.47 | 0.0 | 0.24 | −1.01 | 1.01 | 1.00 | 0.47 | 0.24 | −0.87 |
| | W | 1.27 | 2.53 | 1.27 | 1.27 | 1.27 | 1.27 | 2.53 | 1.27 | 1.27 |
| F5 | N | 1.00 | 2.24 | 1.67 | 2.65 | −2.65 | −0.37 | 1.00 | 1.62 | 2.27 |
| | W | 0.00 | 0.0 | 0.00 | 0.00 | 0.00 | 0.00 | 0.00 | 0.00 | 0.00 |
| F7 | N | 1.00 | 0.0 | 1.50 | −2.13 | 2.13 | 2.11 | 1.00 | 0.50 | −1.82 |
| | W | 0.45 | 0.90 | 0.45 | 0.45 | 0.45 | 0.45 | 0.90 | 0.45 | 0.45 |
| F8 | N | 1.00 | −1.00 | 0.0 | −4.26 | 4.26 | 3.21 | 1.00 | 0.0 | −3.65 |
| | W | 0.0 | 0.0 | 0.0 | 0.0 | 0.0 | 0.37 | 0.73 | 0.37 | 0.37 |
| R1 | N | 0.0 | 1.00 | 0.50 | 2.13 | −2.13 | −1.11 | 0.00 | 0.50 | 1.82 |
| | W | 2.00 | 4.00 | 2.00 | 2.00 | 2.00 | 2.00 | 4.00 | 2.00 | 2.00 |
| R2 | N | −1.00 | 1.00 | 0.0 | 4.26 | −4.26 | −3.21 | −1.00 | 0.0 | 3.65 |
| | W | 2.00 | 4.00 | 2.00 | 2.00 | 2.00 | 0.37 | 0.73 | 0.37 | 0.37 |

| A | G | X3 | | | | X4 | | | |
|---|---|---|---|---|---|---|---|---|---|
| | | S3 | C3 | RG3 | P4 | S4 | C4 | RG4 | P5 |
| F1 | N | 1.00 | 0.26 | 0.00 | −0.18 | 0.73 | 0.26 | 0.00 | −1.20 |
| | W | 2.82 | 5.63 | 2.82 | 2.82 | 0.0 | 0.0 | 0.0 | 0.0 |
| F2 | N | −0.17 | 0.29 | 0.45 | 0.50 | 0.0 | 0.29 | 0.45 | 0.73 |
| | W | 2.55 | 5.09 | 2.55 | 2.55 | 4.45 | 8.90 | 4.45 | 4.45 |
| F3 | N | 1.00 | 0.49 | 0.31 | −0.56 | 0.81 | 0.49 | 0.31 | −0.82 |
| | W | 1.50 | 3.00 | 1.50 | 1.50 | 0.0 | 0.0 | 0.0 | 0.0 |
| F4 | N | 1.00 | 0.61 | 0.47 | −0.43 | 0.86 | 0.61 | 0.47 | −0.63 |
| | W | 1.27 | 2.41 | 1.21 | 1.21 | 0.0 | 0.0 | 0.0 | 0.0 |
| F5 | N | −0.37 | 0.64 | 1.00 | 1.12 | 0.0 | 0.64 | 1.00 | 1.64 |
| | W | 0.00 | 0.00 | 0.00 | 0.00 | 1.00 | 2.00 | 1.00 | 1.00 |
| F7 | N | 2.11 | 1.29 | 1.00 | −0.90 | 1.81 | 1.29 | 1.00 | −1.32 |
| | W | 0.57 | 1.14 | 0.57 | 0.57 | 0.0 | 0.0 | 0.0 | 0.0 |
| F8 | N | 3.21 | 1.58 | 1.00 | −1.80 | 2.61 | 1.58 | 1.00 | −2.65 |
| | W | 0.47 | 0.93 | 0.47 | 0.47 | 0.0 | 0.0 | 0.0 | 0.0 |
| R1 | N | −1.11 | −0.29 | 0.00 | 0.90 | −0.81 | −0.29 | 0.00 | 1.32 |
| | W | 2.55 | 5.09 | 2.55 | 2.55 | 0.0 | 0.0 | 0.0 | 0.0 |
| R2 | N | −3.21 | −1.58 | −1.00 | 1.80 | −2.61 | −1.58 | −1.00 | 2.65 |
| | W | 0.47 | 0.93 | 0.47 | 0.47 | 0.0 | 0.0 | 0.0 | 0.0 |

Figure 8:
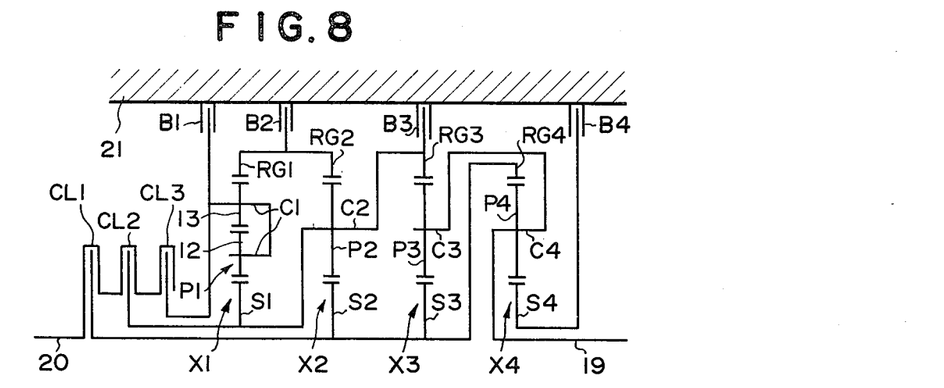

In FIG. 8, there is also shown a further embodiment of the present invention. The illustrated embodiment is different from the embodiments shown in FIGS. 2 through 7 only in that the fourth planetary carrier C4 is connected with the third planetary carrier C3 and the output shaft 19, and the fourth ring gear RG4 is connected with the second and third sun gears S2 and S3, while the fourth sun gear S4 is connected through fourth brake means B4 with and the casing 21. For the purpose of description, it is assumed that the value $I_4$ is 0.280. The speed ratios in respective speed changing stages in this instance are shown in Table 8. The rotating speeds and the tangential forces in respective elements of the planetary gear sets are shown in Table 8A.

TABLE 8

Figure 9:
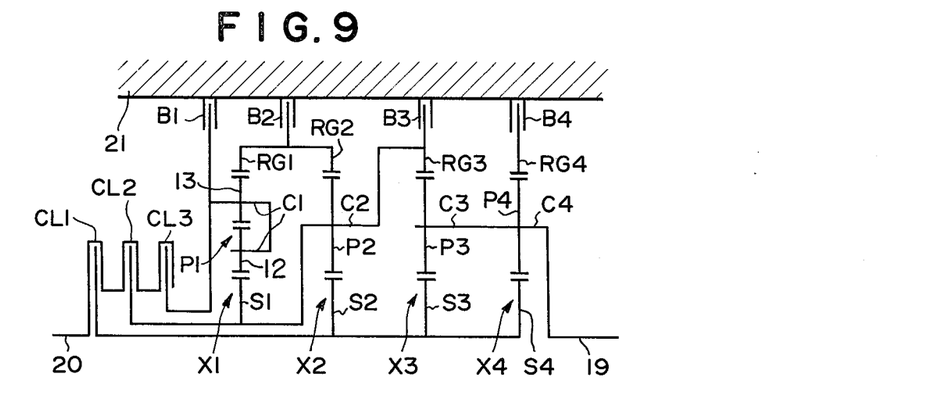

| | CL1 | CL2 | CL3 | B1 | B2 | B3 | B4 | SPEED RATIO |
|---|---|---|---|---|---|---|---|---|
| F1 | O | | | | O | | | 1 : 3.82 |
| F2 | O | | | O | | | | 1 : 2.03 |
| F3 | O | | | | | O | | 1 : 1.63 |
| F4 | O | | | | | | O | 1 : 1.28 |
| F5 | O | O | | | | | | 1 : 1.00 |
| F6 | | O | | | | | O | 1 : 0.90 |
| F7 | | O | | | | O | | 1 : 0.78 |
| F8 | | | O | | | | O | 1 : 0.56 |
| R1 | | | O | | O | | | 1 : −3.45 | planetary carrier C4 is connected with the output shaft 19 and the third planetary carrier C3, while the fourth brake means B4 is interposed between the fourth ring gear RG4 and the casing 21. As in the previous embodiment, it is assumed that the value $I_4$ is 0.280. The speed ratios in respective speed changing stages in this instance obtained in response to selective actuation of the clutch means CL1, CL2 and CL3 and the brake means B1, B2, B3 and B4 are shown in Table 9. The rotating speeds and the tangential forces in respective elements of the planetary gear sets are shown in Table 9A.

TABLE 9

| | CL1 | CL2 | CL3 | B1 | B2 | B3 | B4 | SPEED RATIO |
|---|---|---|---|---|---|---|---|---|
| F1 | O | | | | | | O | 1 : 4.57 |
| F2 | O | | | | | O | | 1 : 3.82 |
| F3 | O | | | | O | | | 1 : 2.08 |
| F4 | O | | | O | | | | 1 : 1.63 |
| F5 | O | O | | | | | | 1 : 1.00 |
| F6 | | O | | | O | | | 1 : 0.78 |
| F7 | | O | | | | | O | 1 : 0.63 |
| R1 | | | O | O | | | | 1 : −4.64 |
| R2 | | | O | | | O | | 1 : −3.45 |
| R3 | | | O | | O | | | 1 : −0.63 |

TABLE 8A

| | B | X1 | | | | | X2 | | | |
|---|---|---|---|---|---|---|---|---|---|---|
| A | | S1 | C1 | RG1 | P1 | P2 | S2 | C2 | RG2 | P3 |
| F1 | N | 0.0 | −0.90 | −0.45 | −1.93 | 1.93 | 1.00 | 0.00 | −0.45 | −1.65 |
| | W | 0.00 | 00.0 | 0.00 | 0.00 | 0.00 | 0.0 | 0.00 | 0.00 | 0.00 |
| F2 | N | 0.31 | −0.31 | 0.0 | −1.33 | 1.33 | 1.00 | 0.31 | 0.0 | −1.14 |
| | W | 0.00 | 0.0 | 0.00 | 0.00 | 0.00 | 1.03 | 2.07 | 1.03 | 1.03 |
| F3 | N | 0.47 | 0.0 | 0.24 | −1.01 | 1.01 | 1.00 | 0.47 | 0.24 | −0.87 |
| | W | 1.27 | 2.53 | 1.27 | 1.27 | 1.27 | 1.27 | 2.53 | 1.27 | 1.27 |
| F4 | N | 0.70 | 0.44 | 0.57 | −0.57 | 0.57 | 1.00 | 0.70 | 0.57 | −0.49 |
| | W | 0.0 | 0.0 | 0.0 | 0.0 | 0.0 | 0.0 | 0.0 | 0.0 | 0.0 |
| F6 | N | 1.00 | 0.62 | 0.81 | −0.81 | 0.81 | 1.42 | 1.00 | 0.81 | −0.69 |
| | W | 0.0 | 0.0 | 0.0 | 0.0 | 0.0 | 0.0 | 0.0 | 0.0 | 0.0 |
| F7 | N | 1.00 | 0.0 | 0.50 | −2.13 | 2.13 | 2.11 | 1.00 | 0.50 | −1.82 |
| | W | 0.45 | 0.90 | 0.45 | 0.45 | 0.45 | 0.45 | 0.90 | 0.45 | 0.45 |
| F8 | N | 1.00 | −1.00 | 0.0 | −4.26 | 4.26 | 3.21 | 1.00 | 0.0 | −3.65 |
| | W | 0.0 | 0.0 | 0.0 | 0.0 | 0.0 | 0.37 | 0.73 | 0.37 | 0.37 |
| F9 | N | 1.62 | 1.00 | 1.31 | −1.31 | 1.31 | 2.30 | 1.62 | 1.31 | −1.12 |
| | W | 2.00 | 4.00 | 2.00 | 2.00 | 2.00 | 2.00 | 4.00 | 2.00 | 2.00 |
| R1 | N | 0.0 | 1.00 | 0.50 | 2.13 | −2.13 | −1.11 | 0.00 | 0.50 | 1.82 |
| | W | 2.00 | 4.00 | 2.00 | 2.00 | 2.00 | 2.00 | 4.00 | 2.00 | 2.00 |
| R2 | N | −1.00 | 1.00 | 0.0 | 4.26 | −4.26 | −3.21 | −1.00 | 0.0 | 3.65 |
| | W | 2.00 | 4.00 | 2.00 | 2.00 | 2.00 | 0.37 | 0.73 | 0.37 | 0.37 |

| | B | X3 | | | | X4 | | | |
|---|---|---|---|---|---|---|---|---|---|
| A | | S3 | C3 | RG3 | P4 | S4 | C4 | RG4 | P5 |
| F1 | N | 1.00 | 0.26 | 0.00 | −0.18 | −2.37 | 0.26 | 1.00 | 2.05 |
| | W | 2.82 | 5.63 | 2.82 | 2.82 | 0.0 | 0.0 | 0.0 | 0.0 |
| F2 | N | 1.00 | 0.49 | 0.31 | −0.56 | −1.32 | 0.49 | 1.00 | 1.41 |
| | W | 1.50 | 3.00 | 1.50 | 1.50 | 0.0 | 0.00 | 0.00 | 0.00 |
| F3 | N | 1.00 | 0.61 | 0.47 | −0.43 | −0.77 | 0.61 | 1.00 | 1.08 |
| | W | 1.21 | 2.41 | 1.21 | 1.21 | 0.0 | 0.00 | 0.00 | 0.00 |
| F4 | N | 1.00 | 0.78 | 0.70 | −0.24 | 0.0 | 0.78 | 1.00 | 0.61 |
| | W | 0.0 | 0.0 | 0.0 | 0.0 | 1.00 | 2.00 | 1.00 | 1.00 |
| F6 | N | 1.42 | 1.11 | 1.00 | −0.34 | 0.0 | 1.11 | 1.42 | 0.86 |
| | W | 1.00 | 2.00 | 1.00 | 1.00 | 0.36 | 0.71 | 0.36 | 0.36 |
| F7 | N | 2.11 | 1.29 | 1.00 | −0.90 | −1.63 | 1.29 | 2.11 | 2.27 |
| | W | 0.57 | 1.14 | 0.57 | 0.57 | 0.0 | 0.0 | 0.0 | 0.0 |
| F8 | N | 3.21 | 1.58 | 1.00 | −1.80 | −4.25 | 1.58 | 3.21 | 4.54 |
| | W | 0.47 | 0.93 | 0.47 | 0.47 | 0.0 | 0.00 | 0.00 | 0.00 |
| F9 | N | 2.30 | 1.79 | 1.62 | −0.55 | 0.0 | 1.79 | 2.30 | 1.39 |
| | W | 1.90 | 3.81 | 1.90 | 1.90 | 1.58 | 3.16 | 1.58 | 1.58 |
| R1 | N | −1.11 | −0.29 | 0.00 | 0.90 | 2.63 | −0.29 | −1.11 | −2.27 |
| | W | 2.55 | 5.09 | 2.55 | 2.55 | 0.0 | 0.0 | 0.0 | 0.0 |
| R2 | N | −3.21 | −1.58 | −1.00 | 1.80 | 4.25 | −1.58 | −3.21 | −4.54 |
| | W | 0.47 | 0.93 | 0.47 | 0.47 | 0.0 | 0.00 | 0.00 | 0.00 |

Referring to FIG. 9, there is shown a further embodiment of the present invention which is different from the embodiments shown in FIGS. 2 through 8 only in that the fourth sun gear S4 is connected with the second and the third sun gears S2 and S3 and the fourth

TABLE 9A

| | H | X1 | | | | | | X2 | | |
|---|---|---|---|---|---|---|---|---|---|---|
| A | | S1 | C1 | RG1 | R1 | P2 | S2 | C2 | RG2 | P3 |
| F1 | N | −0.06 | −1.02 | −0.54 | −2.04 | 2.04 | 1.00 | −0.06 | −0.54 | −1.75 |
| | W | 0.0 | 0.0 | 0.0 | 0.0 | 0.0 | 0.0 | 0.0 | 0.0 | 0.0 |

TABLE 9A-continued

| | H | | X3 | | | | X4 | | |
|---|---|---|---|---|---|---|---|---|---|
| A | | S3 | C3 | RG3 | P4 | S4 | C4 | RG4 | P5 |
| | N | 0.0 | −0.90 | −0.45 | −1.93 | 1.93 | 1.00 | 0.00 | −0.45 | −1.65 |
| F2 | W | 0.00 | 0.0 | 0.00 | 0.00 | 0.00 | 0.0 | 0.00 | 0.00 | 0.00 |
| | N | 0.31 | −0.31 | 0.0 | −1.33 | 1.33 | 1.00 | 0.31 | 0.0 | −1.14 |
| F3 | W | 0.0 | 0.0 | 0.0 | 0.0 | 0.0 | 1.03 | 2.07 | 1.03 | 1.03 |
| | N | 0.47 | 0.0 | 0.24 | −1.01 | 1.01 | 1.00 | 0.47 | 0.24 | −0.87 |
| F4 | W | 1.27 | 2.53 | 1.27 | 1.27 | 1.27 | 1.27 | 2.53 | 1.27 | 1.27 |
| | N | 1.00 | 0.0 | 0.50 | −2.13 | 2.13 | 2.11 | 1.00 | 0.50 | −1.82 |
| F6 | W | 0.45 | 0.90 | 0.45 | 0.45 | 0.45 | 0.90 | 0.45 | 0.45 |
| | N | 1.00 | −1.00 | 0.0 | −4.26 | 4.26 | 3.21 | 1.00 | 0.0 | −3.65 |
| F7 | W | 0.0 | 0.0 | 0.0 | 0.0 | 0.0 | 0.37 | 0.73 | 0.37 | 0.37 |
| | N | 0.00 | 1.00 | 0.53 | 2.01 | −2.01 | −0.98 | 0.06 | 0.53 | 1.72 |
| R1 | W | 2.00 | 4.00 | 2.00 | 2.00 | 2.00 | 2.00 | 4.00 | 2.00 | 2.00 |
| | N | 0.0 | 1.00 | 0.50 | 2.13 | −2.13 | −1.11 | 0.00 | 0.50 | 1.82 |
| R2 | W | 2.00 | 4.00 | 2.00 | 2.00 | 2.00 | 2.00 | 4.00 | 2.00 | 2.00 |
| | N | −1.00 | 1.00 | 0.0 | 4.26 | −4.26 | −3.21 | −1.00 | 0.0 | 3.65 |
| R3 | W | 2.00 | 4.00 | 2.00 | 2.00 | 2.00 | 0.37 | 0.73 | 0.37 | 0.37 |

| | H | | X3 | | | | X4 | | |
|---|---|---|---|---|---|---|---|---|---|
| A | | S3 | C3 | RG3 | P4 | S4 | C4 | RG4 | P5 |
| | N | 1.00 | 0.22 | −0.06 | −0.86 | 1.00 | 0.22 | 0.0 | −0.61 |
| F1 | W | 0.0 | 0.0 | 0.0 | 0.0 | 3.57 | 7.14 | 3.57 | 3.57 |
| | N | 1.00 | 0.26 | 0.00 | −0.81 | 1.00 | 0.26 | 0.06 | −0.57 |
| F2 | W | 2.82 | 5.63 | 2.82 | 2.82 | 0.0 | 0.0 | 0.0 | 0.0 |
| | N | 1.00 | 0.49 | 0.31 | −0.56 | 1.00 | 0.49 | 0.35 | −0.40 |
| F3 | W | 1.50 | 3.00 | 1.50 | 1.50 | 0.00 | 0.0 | 0.0 | 0.0 |
| | N | 1.00 | 0.61 | 0.47 | −0.43 | 1.00 | 0.61 | 0.50 | −0.30 |
| F4 | W | 1.21 | 2.41 | 1.21 | 1.21 | 0.00 | 0.0 | 0.0 | 0.0 |
| | N | 2.11 | 1.29 | 1.00 | −0.90 | 2.11 | 1.29 | 1.06 | −0.63 |
| F6 | W | 0.57 | 1.14 | 0.57 | 0.57 | 0.00 | 0.0 | 0.0 | 0.0 |
| | N | 3.21 | 1.58 | 1.00 | −1.80 | 3.21 | 1.58 | 1.12 | −1.27 |
| F7 | W | 0.47 | 0.93 | 0.47 | 0.47 | 0.0 | 0.0 | 0.0 | 0.0 |
| | N | −0.98 | −0.22 | 0.06 | 0.85 | −0.98 | −0.22 | 0.00 | 0.60 |
| R1 | W | 1.90 | 3.81 | 1.90 | 1.90 | 5.64 | 11.29 | 5.64 | 5.64 |
| | N | −1.11 | −0.29 | 0.00 | 0.90 | −1.11 | −0.29 | −0.06 | 0.63 |
| R2 | W | 2.55 | 5.09 | 2.55 | 2.55 | 0.0 | 0.0 | 0.0 | 0.0 |
| | N | −3.21 | −1.58 | −1.00 | 1.80 | −3.21 | −1.58 | −1.12 | 1.27 |
| R3 | W | 0.47 | 0.93 | 0.47 | 0.47 | 0.00 | 0.0 | 0.0 | 0.0 |

The invention has thus been shown and described with reference to preferred embodiments and it will now be apparent that the present invention provides a new power transmission having multiple speed changing stages. However, it should be noted herein that the invention is in no way limited to the details of the illustrated arrangements but changes and modifications may be made in various ways. For example, from Table 1, it will be seen that one or more of the clutch means CL1, CL2 and CL3 and the brake means B1, B2 and B3 may be omitted to provide a multiple stage power transmission. For example, only with the clutch means CL1 and CL3 and the brake means B1, B2 and B3, the forward drive stages F1, F2 and F3 and the reverse drive stages R1 and R2 can be obtained. Similarly, referring to the Table 2, it will be noted that only with clutches CL1 and CL3 and the brake means B2, B3 and B4, the forward driving stages F1, F2 and F3 and the reverse driving stages R1, R2 and R3 can be obtained. Referring to Table 4, it will also be noted that with the clutch means CL1 and CL3 and the brake means B1, B2 and B4, the forward drive stages F2, F3 and F4 and the reverse drive stages R2 and R3 can be obtained. Thus, it should be contemplated that the essential feature of the present invention is to provide at least one of the clutch means CL1, CL2 and CL3 and at least one of the brake means B1, B2 and B3 in combination with the gear mechanism 1 comprising the three planetary gear sets X1, X2 and X3.

We claim:

1. Power transmission for a motor vehicle comprising an input shaft and an output shaft rotatable about a common axis; a gear mechanism including a first planetary gear set having a first sun gear rotatably supported about said common axis, a first ring gear and first planetary means including inner pinion means meshed with said first sun gear, outer pinion means meshed with said inner pinion means and said first ring gear, and a first planetary carrier supported for rotation about said common axis and rotatably supporting said inner and outer pinion means; a second planetary gear set having a second sun gear rotatably supported about said common axis, a second ring gear having internal teeth and connected to said first ring gear for movement therewith, second planetary pinion means meshed with said second sun gear and said second ring gear, and a second planetary carrier connected to said first sun gear for movement therewith and rotatably supporting said second planetary pinion means; and a third planetary gear set having a third sun gear connected to said second sun gear for movement therewith, a third ring gear having internal teeth and connected to said second planetary carrier for movement therewith, third planetary pinion means meshed with said third sun gear and said third ring gear, and a third planetary carrier rotatably supported about said common axis and rotatably supporting said third planetary pinion means, said third planetary carrier being connected to said output shaft for movement therewith; clutch means for selectively coupling said first sun gear, said first planetary carrier, and said second and third sun gears to said input shaft; and brake means actuatable for selective engagement with said first planetary carrier, said first and second ring gears, and said third ring gear.

2. Power transmission for a motor vehicle in accordance with claim 1 in which said clutch means includes a first clutch for connecting said second and third sun gears with said input shaft and a second clutch for connecting said first planetary carrier with said input shaft.

3. Power transmission for a motor vehicle in accordance with claim 2 in which said brake means includes a first brake selectively engageable with said first planetary carrier, a second brake selectively engageable with said first and second ring gears, and a third brake selectively engageable with said third ring gear.

4. Power transmission in accordance with claim 1 which further comprises a fourth planetary gear set including a fourth sun gear connected to said output shaft for movement therewith, a fourth ring gear connected to said third ring gear for movement therewith, fourth planetary pinion means meshed with said fourth sun gear and the fourth ring gear and a fourth planetary carrier rotatably supporting said fourth planetary pinion means; and further brake means actuatable for selective engagement with said fourth planetary carrier.

5. Power transmission means in accordance with claim 1 which further comprises a fourth planetary gear set including a fourth sun gear connected to the third ring gear for movement therewith, a fourth ring gear connected to the output shaft for movement therewith, fourth planetary pinion means meshed with the fourth sun gear and the fourth ring gear and a fourth planetary carrier rotatably supporting said fourth planetary pinion means; and brake means actuatable for selective engagement with the fourth planetary carrier.

6. Power transmission in accordance with claim 1 which further comprises a fourth planetary gear set including a fourth sun gear connected to the third ring gear for movement therewith, a fourth ring gear, fourth planetary gear means meshed with the fourth sun gear and the fourth ring gear, a fourth planetary carrier rotatably supporting the fourth planetary pinion means and connected to the output shaft for movement therewith; and brake means actuatable for selective engagement with the fourth ring gear.

7. Power transmission in accordance with claim 1 which further comprises a fourth planetary gear set including a fourth sun gear connected to the second and third sun gears for movement therewith, a fourth ring gear, fourth planetary pinion means meshed with the fourth sun gear and the fourth ring gear, and a fourth planetary carrier rotatably supporting the fourth planetary pinion means and connected to the output shaft for movement therewith; and brake means actuatable for selective engagement with the fourth ring gear.

8. Power transmission for a motor vehicle comprising an input shaft and an output shaft rotatable about a common axis; a gear mechanism including a first planetary gear set having a first sun gear supported rotatably about said common axis, a first ring gear having internal teeth, and first planetary means including inner planetary pinion means meshed with said first sun gear, outer pinion means meshed with said inner pinion means and said first ring gear and a first planetary carrier supported for rotation about said common axis and rotatably supporting said inner and outer pinion means; a second planetary gear set having a second sun gear rotatably supported about said common axis, a second ring gear having internal teeth and connected to said first ring gear for movement therewith, second planetary pinion means meshed with said second sun gear and said second ring gear, and a second planetary carrier connected to said first sun gear for movement therewith and rotatably supporting said second planetary pinion means; and, a third planetary gear set having a third sun gear connected to said second sun gear for movement therewith, a third ring gear having internal teeth and connected to said second planetary carrier for movement therewith, third planetary pinion means meshed with said thrd sun gear and said third ring gear, and a third planetary carrier connected to said output shaft for movement therewith and rotatably supporting said third planetary pinion means; first clutch means for selectively coupling said second and third sun gears to said input shaft; second clutch means for selectively coupling said first sun gear to said input shaft; third clutch means for selectively coupling said first planetary carrier to said input shaft; first brake means actuatable for selective engagement with said first planetary carrier; and second brake means actuatable for selective engagement with said first and second ring gears.

9. Power transmission in accordance with claim 8 further including third brake means actuatable for selective engagement with said third ring gear.

10. Power transmission in accordance with claim 9 which further comprises a fourth planetary gear set including a fourth sun gear connected to said output shaft for movement therewith, a fourth ring gear connected to said third ring gear for movement therewith, fourth planetary pinion means meshed with the fourth sun gear and the fourth ring gear and a fourth planetary carrier rotatably supporting said fourth planetary pinion means; and fourth brake means actuatable for selective engagement with the fourth planetary carrier.

11. Power transmission in accordance with claim 9 which further comprises a fourth planetary gear set including a fourth sun gear connected to the third ring gear for movement therewith, a fourth ring gear connected to the output shaft for movement therewith, fourth planetary pinion means meshed with the fourth sun gear and the fourth ring gear and a fourth planetary carrier rotatably supporting said fourth planetary pinion means; and fourth brake means actuatable for selective engagement with the fourth planetary carrier.

12. Power transmission in accordance with claim 9 which further comprises a fourth planetary gear set including a fourth sun gear connected to the third ring gear for movement therewith, a fourth ring gear, fourth planetary gear means meshed with the fourth sun gear and the fourth ring gear, a fourth planetary carrier rotatably supporting the fourth planetary pinion means and connected to the output shaft for movement therewith; and fourth brake means actuatable for selective engagement with the fourth ring gear.

13. Power transmission in accordance with claim 9 which further comprises a fourth planetary gear set including a fourth sun gear connected to the second and third sun gears for movement therewith, a fourth ring gear, fourth planetary pinion means meshed with the fourth sun gear and the fourth ring gear, and a fourth planetary carrier rotatably supporting the fourth planetary pinion means and connected to the output shaft for movement therewith; and fourth brake means actuatable for selective engagement with the fourth ring gear.

14. Power transmission for a motor vehicle comprising an input shaft and an output shaft rotatable about a common axis; a gear mechanism including a first planetary gear set having a first sun gear supported rotatably about said common axis, a first ring gear having internal teeth, and first planetary means including inner planetary pinion means meshed with said sun gear, outer pinion means meshed with said inner pinion means and said first ring gear and a first planetary carrier supported for rotation about said common axis and rotatably supporting said inner and outer pinion means; a second planetary gear set having a second sun gear rotatably supported about said common axis, a second ring gear having internal teeth and connected to said first ring gear for the movement therewith, second planetary pinion means meshed with said second sun gear and said second ring gear, and a second planetary carrier connected to said first sun gear for movement therewith and rotatably supporting said second planetary pinion means; and a third planetary gear set having a third sun gear connected to said second sun gear for movement therewith, a third ring gear having internal teeth and connected to said second planetary carrier for movement therewith, third planetary pinion means meshed with said third sun gear and said thrd ring gear, and a third planetary carrier connected to said output shaft for movement therewith and rotatably supporting said third planetry pinion means; first clutch means for selectively coupling said second and third sun gears to said input shaft; second clutch means for selectively coupling said first sun gear to said input shaft; third clutch means for selectively coupling said first planetary carrier to said input shaft; first brake means actuatable for selective engagement with first planetary carrier; and second brake means actuatable for selective engagement with said third ring gear.

15. Power transmission for a motor vehicle comprising an input shaft and an output shaft rotatable about a common axis; a gear mechanism including a first planetary gear set having a first sun gear supported rotatably about said common axis, a first ring gear having internal teeth, and first planetary means including inner planetary pinion means meshed with said first sun gear, outer pinion means meshed with said inner pinion means and said first ring gear and a first planetary carrier supported for rotation about said common axis and rotatably supporting said inner and outer pinion means; a second planetary gear set having a second sun gear rotatably supported about said common axis, a second ring gear having internal teeth and connected to said first ring gear for movement therewith, second planetary pinion means meshed with said second sun gear and the econd ring gear, and a second planetary carrier connected to said first sun gear for movement therewith and rotatably supporting said second planetary pinion means; and a third planetary gear set having a third sun gear connected to said second sun gear for movement therewith, a third ring gear having internal teeth and connected to said second planetary carrier for movement therewith, third planetary pinion means meshed with said third sun gear and said third ring gear, and a third planetary carrier connected to said output shaft for movement therewith and rotatably supporting said third planetary pinion means; first clutch means selectively coupling said second and third sun gears to said input shaft; second clutch means for selectively coupling said first sun gear to said input shaft; third clutch means for selectively coupling said first planetary carrier to said input shaft; first brake means actuatable for selective engagement with said first and second ring gears; and second brake means actuatable for selective engagement with third ring gear.

16. Power transmission in accordance with claim 15 which further comprises a fourth planetary gear set including a fourth sun gear connected to said output shaft for movement therewith, a fourth ring gear connected to said third ring gear for movement therewith, fourth planetary pinion means meshed with the fourth sun gear and the fourth ring gear and a fourth planetary carrier rotatably supporting said fourth planetry pinion means; and third brake means actuatable for selective engagement with the fourth planetary carrier.

17. Power transmission in accordance with claim 15 which further comprises a fourth planetary gear set including a fourth sun gear connected to the third ring gear for movement therewith, a fourth ring gear connected to the output shaft for movement therewith, fourth planetary pinion means meshed with the fourth sun gear and the fourth ring gear and a fourth planetary carrier rotatably supporting said fourth planetary pinion means; and third brake means actuatable for selective engagement with the fourth planetary carrier.

18. Power transmission in accordance with claim 15 which further comprises a fourth planetary gear set including a fourth sun gear connected to the third ring gear for movement therewith, a fourth ring gear, fourth planetary gear means meshed with the fourth sun gear and the fourth ring gear, a fourth planetry carrier rotatably supporting the fourth planetary pinion means and connected to the output shaft for movement therewith; and third brake means actuatable for selective engagement with the fourth ring gear.

19. Power transmission in accordance with claim 15 which further comprises a fourth planetary gear set including a fourth sun gear connected to the second and third sun gears for movement therewith, a fourth ring gear, fourth planetary pinion means meshed with the fourth sun gear and the fourth ring gear, and a fourth planetary carrier rotatably supporting the fourth planetary pinion means and connected to the output shaft for movement therewith; and third brake means actuatable for selective engagement with the fourth ring gear.

* * * * *

UNITED STATES PATENT AND TRADEMARK OFFICE
CERTIFICATE OF CORRECTION

PATENT NO. : 3,987,690
DATED : October 26, 1976
INVENTOR(S) : Noboru Murakami et al It is certified that error appears in the above-identified patent and that said Letters Patent are hereby corrected as shown below:

Claim 8, column 20, line 2, change "thrd" to --third--;

Claim 14, column 21, line 14, change "thrd" to --third--;

line 17, change "planetry" to --planetary--;

Claim 15, column 21, line 42, change "econd" to --second--.

Signed and Sealed this

Eighth Day of February 1977

[SEAL]

Attest:

RUTH C. MASON
*Attesting Officer*

C. MARSHALL DANN
*Commissioner of Patents and Trademarks*